United States Patent
Inoue et al.

(10) Patent No.: US 11,902,487 B2
(45) Date of Patent: Feb. 13, 2024

(54) IMAGE PROCESSING DEVICE, IMAGE PROCESSING METHOD, AND COMPUTER READABLE MEDIUM

(71) Applicant: DENSO TEN Limited, Kobe (JP)

(72) Inventors: Noriaki Inoue, Kobe (JP); Tatsuya Hamaoka, Kobe (JP)

(73) Assignee: DENSO TEN Limited, Kobe (JP)

( * ) Notice: Subject to any disclaimer, the term of this patent is extended or adjusted under 35 U.S.C. 154(b) by 262 days.

(21) Appl. No.: 17/463,852

(22) Filed: Sep. 1, 2021

(65) Prior Publication Data

US 2022/0368810 A1 Nov. 17, 2022

(30) Foreign Application Priority Data

May 14, 2021 (JP) .................. 2021-082723

(51) Int. Cl.
*G06V 20/62* (2022.01)
*H04N 1/44* (2006.01)
*G06F 21/60* (2013.01)
*G06V 40/16* (2022.01)

(52) U.S. Cl.
CPC ......... *H04N 1/4486* (2013.01); *G06F 21/602* (2013.01); *G06V 20/62* (2022.01); *G06V 40/161* (2022.01)

(58) Field of Classification Search
CPC .... H04N 1/4486; G06V 20/62; G06V 40/161; G06F 21/602
USPC ........................................................ 380/243
See application file for complete search history.

(56) References Cited

U.S. PATENT DOCUMENTS

| | | | | |
|---|---|---|---|---|
| 5,907,619 A | * | 5/1999 | Davis ................... | H04N 7/1675 713/180 |
| 8,345,921 B1 | * | 1/2013 | Frome ................... | G06V 20/56 382/105 |
| 8,984,299 B1 | * | 3/2015 | Yi ........................... | G06F 21/14 713/189 |
| 9,350,914 B1 | * | 5/2016 | Kaur ....................... | G06F 18/00 |
| 11,509,635 B1 | * | 11/2022 | Jain ....................... | G06F 21/602 |
| 2003/0231769 A1 | * | 12/2003 | Bolle ................... | H04L 9/0847 380/210 |
| 2007/0201694 A1 | * | 8/2007 | Bolle ................... | G06T 1/0021 380/205 |
| 2008/0181533 A1 | * | 7/2008 | Jung ................... | G11B 27/034 382/283 |
| 2009/0031139 A1 | * | 1/2009 | Geoffrey ............... | H04L 9/3231 713/186 |

(Continued)

FOREIGN PATENT DOCUMENTS

| | | |
|---|---|---|
| JP | 2007-164275 A | 6/2007 |
| JP | 2010-278650 A | 12/2010 |
| WO | 2018-003953 A1 | 1/2018 |

*Primary Examiner* — Thanh T Le
(74) *Attorney, Agent, or Firm* — Oliff PLC

(57) ABSTRACT

An image processing device includes: a recognition unit configured to recognize a part of a confidential target from a captured image; a processing unit configured to process the captured image such that the part recognized by the recognition unit is concealed; an encryption unit configured to encrypt data relating to the part recognized by the recognition unit; and a merging unit configured to merge data of the image processed by the processing unit and the data encrypted by the encryption unit.

8 Claims, 12 Drawing Sheets

(56) References Cited

U.S. PATENT DOCUMENTS

| | | | |
|---|---|---|---|
| 2011/0222687 A1* | 9/2011 | Mori | H04N 7/1675 |
| | | | 380/200 |
| 2015/0332439 A1* | 11/2015 | Zhang | G06V 20/52 |
| | | | 345/647 |
| 2017/0270384 A1* | 9/2017 | Wilbert | G06V 10/20 |
| 2018/0082131 A1* | 3/2018 | Li | G06V 10/764 |
| 2019/0106317 A1* | 4/2019 | Sahota | G06V 20/62 |
| 2019/0116215 A1* | 4/2019 | Oesterreicher | H04N 21/23439 |
| 2020/0244626 A1 | 7/2020 | Kwon et al. | |
| 2022/0229764 A1* | 7/2022 | Zhai | G06F 18/214 |

\* cited by examiner

```
REPRODUCTION FUNCTION SETTING
    RELEASE OF CONFIDENTIALITY  ● YES      ○ NO
       SYNTHESIZE AND DISPLAY    ● YES      ○ NO
       INDEPENDENT DISPLAY        ○ YES      ● NO
       RELEASE TARGET             ● NUMBER   ● FACE
```

IMAGE PROCESSING DEVICE, IMAGE PROCESSING METHOD, AND COMPUTER READABLE MEDIUM

CROSS-REFERENCE TO RELATED APPLICATIONS

This application is based on and claims priorities under 35 USC 119 from Japanese Patent Application No. 2021-082723 filed on May 14, 2021, the content of which is incorporated herein by reference.

TECHNICAL FIELD

The present invention relates to an image processing device, an image processing method, and a computer readable medium storing an image processing program.

BACKGROUND ART

There have been technologies of concealing sensitive information such as person's face and license plates of other vehicles in an image captured from a vehicle. For example, a method of blotting out or mosaic processing a part of an image corresponding to the sensitive information is known.

CITATION LIST

Patent Literature

Patent Literature 1: JP-A-2007-164275
Patent Literature 2: JP-A-2010-278650

SUMMARY OF INVENTION

However, according to the above technologies, it is difficult to perform concealing processing of the sensitive information, for an image, with high security while controlling as to whether the sensitive information is to be restored. For example, the irreversible concealing method such as blotting out has been used.

The present invention has been made in view of the above situations, and an object thereof is to provide an image processing device and an image processing method capable of performing concealing processing of sensitive information, for an image, with high security while controlling as to whether the sensitive information is to be restored.

To address the object, there is provided an image processing device including: a recognition unit configured to recognize a part of a confidential target from a captured image; a processing unit configured to process the captured image such that the part recognized by the recognition unit is concealed; an encryption unit configured to encrypt data relating to the part recognized by the recognition unit; and a merging unit configured to merge data of the image processed by the processing unit and the data encrypted by the encryption unit.

According to the present invention, it is possible to perform concealing processing of sensitive information, for an image, with high security while controlling as to whether the sensitive information is to be restored.

DESCRIPTION OF EMBODIMENTS

Hereinafter, an embodiment of the image processing device, the image processing method and the image processing program of the present disclosure will be described in detail with reference to the accompanying drawings. Note that, the present invention is not limited to the embodiment described later.

Figure 1:
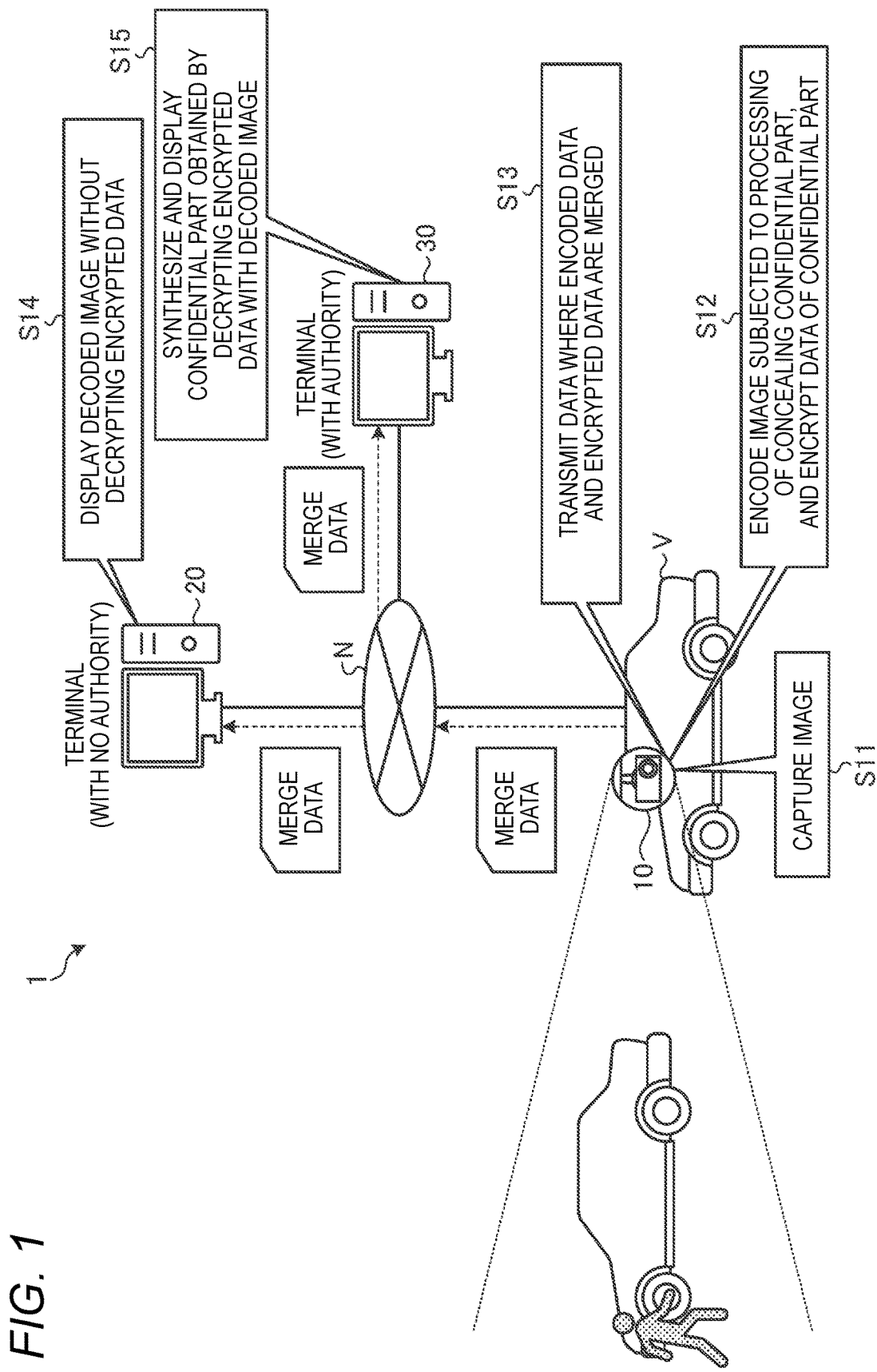
FIG. 1 shows a configuration example of an image processing system according to an embodiment.

First, an image processing system of the embodiment is described with reference to FIG. 1. FIG. 1 shows a configuration example of an image processing system according to an embodiment.

As shown in FIG. 1, an image processing system 1 includes a vehicle V, an image processing device 10 mounted on the vehicle V, a terminal 20 and a terminal 30.

The image processing device 10 is connected to the terminal 20 and the terminal 30 so that data can be communicated via a network N. For example, the network N is the Internet.

A processing flow of the image processing system 1 is described. As shown in FIG. 1, the image processing device 10 captures an image by using a camera (step S11).

For example, the image processing device 10 captures an image ahead of the vehicle V. At this time, so-called sensitive information such as a license plate mounted on a rear part of a vehicle that is positioned ahead of the vehicle V, and a face of a passing person may be taken in the captured image.

Figure 2:
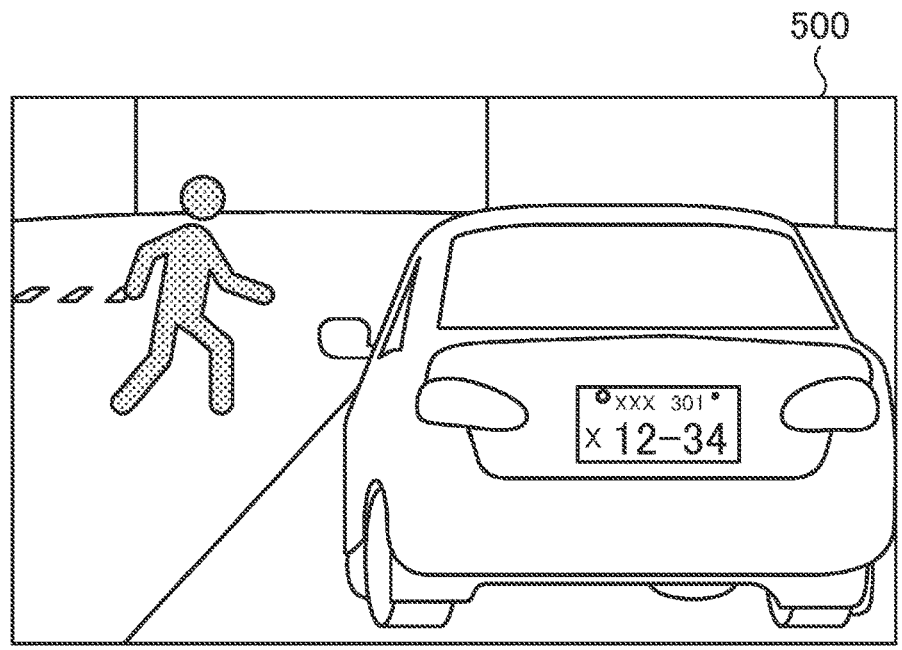
FIG. 2 shows an example of an image.

FIG. 2 shows an example of an image. In the example of FIG. 2, an image 500 captured by the image processing device 10 shows a license plate of a vehicle and a person's face.

The image processing system 1 of the present embodiment is to appropriately treat the sensitive information taken in an image. Specifically, according to the image processing system 1, it is possible to control whether to display the sensitive information, depending on whether a terminal to output an image has an authority.

The image processing device 10 encodes an image subjected to processing of concealing a confidential part, and further encrypts data of the confidential part (step S12).

The confidential part is a part of an image capable of specifying preset sensitive information. Examples of the sensitive information include a license plate of a vehicle, a person's face, or the like.

Figure 3:
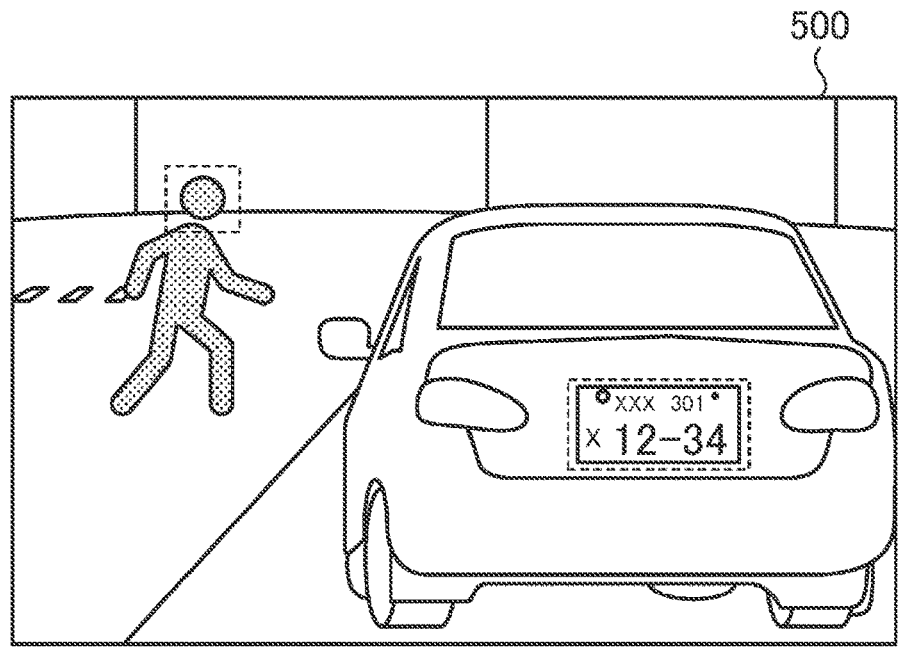
FIG. 3 is a diagram illustrating recognition of a confidential part.

First, the image processing device 10 recognizes a part of a confidential target from the captured image. FIG. 3 illustrates recognition of a confidential part. In the example of FIG. 3, the image processing device 10 recognizes, as the confidential part, a rectangular region including a license plate of a vehicle or a person's face.

For example, the image processing device 10 can perform pattern recognition of the confidential part by using a predetermined image recognition model generated through a machine learning method such as deep learning.

At this time, a part recognized by the image processing device 10 is referred to as a confidential part.

Figure 4:
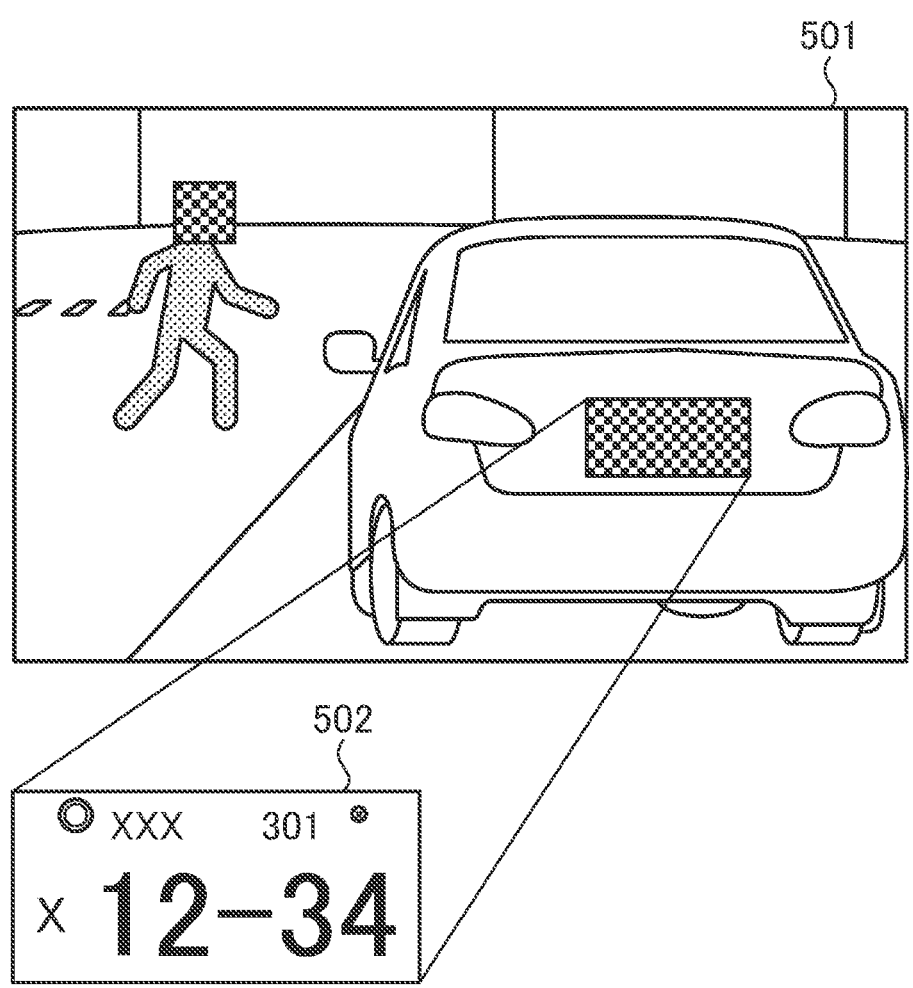
FIG. 4 is a diagram illustrating an image processing.

FIG. 4 shows image processing. As shown in FIG. 4, the image processing device 10 processes the captured image so that the confidential part is concealed. For example, the image processing device 10 performs processing of replacing the confidential part with a predetermined pattern such as mosaic and blackening. An image 501 is a processed image. Thereby, the confidential part can be easily concealed.

The image processing device 10 encrypts data of the confidential part. For example, the image processing device 10 encrypts an image of a region including the confidential part. Thereby, when the encrypted data is decrypted, the image of the confidential part can be restored without changing the same.

In the example of FIG. 4, the image processing device 10 encrypts an image 502 of a license plate. The image processing device 10 may perform encryption by converting (compressing) the image into a ZIP file having a password.

In a case where there is a plurality of confidential parts, the image processing device 10 can individually encrypt each of the confidential parts.

Note that, the image processing device 10 may also encrypt data such as character strings that can specify a confidential part, without being limited to an image.

Then, the image processing device 10 transmits data (merge data) where the encoded data and the encrypted data are merged (step S13).

Thereby, the merge data that has high security and can be controlled as to whether to decrypt the confidential part is obtained.

The image processing device 10 encodes the image processed by the image processing device 10 into data of a predetermined format. The image processing device 10 generates one file where the data encoded by the image processing device 10 and the data encrypted by the image processing device 10 are merged.

In this way, the image processing device 10 can easily handle data after merging by combining the encoded data and the encrypted data into one file.

Note that, in the present embodiment, 'encode' means converting an image into a predetermined format such as H.264. Also, 'encryption' means keeping data confidential by using a password and the like.

Figure 5:
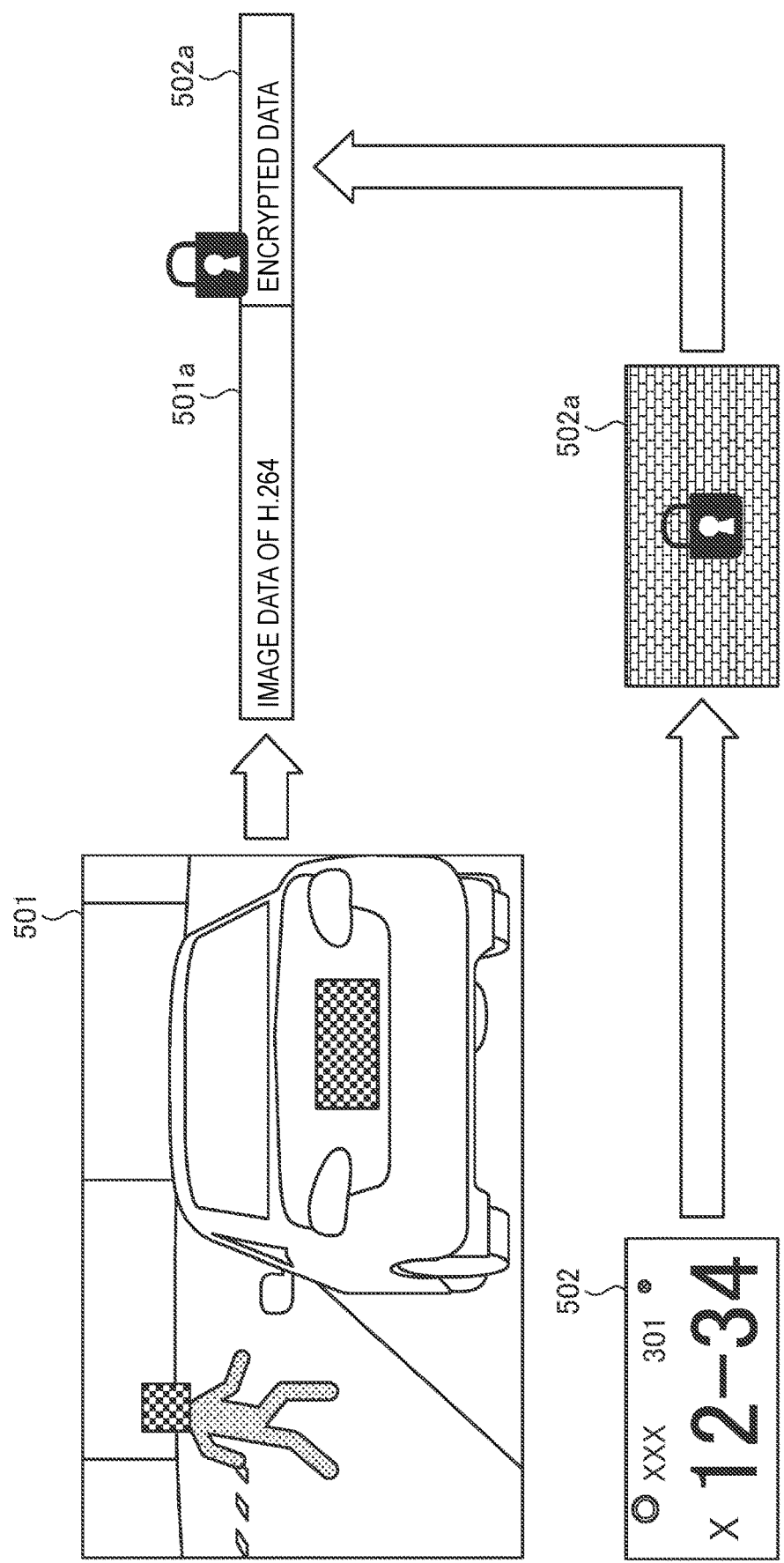
FIG. 5 is a diagram illustrating encryption of confidential information and merging of data.

For example, as shown in FIG. 5, the image processing device 10 converts a processed image 501 into video data 501*a* of H.264 format. FIG. 5 illustrates encryption of confidential information and merging of data.

In addition, the image processing device 10 merges the video data 501 and encrypted data 502*a* where an image 502 of the confidential part is encrypted.

Figure 6:
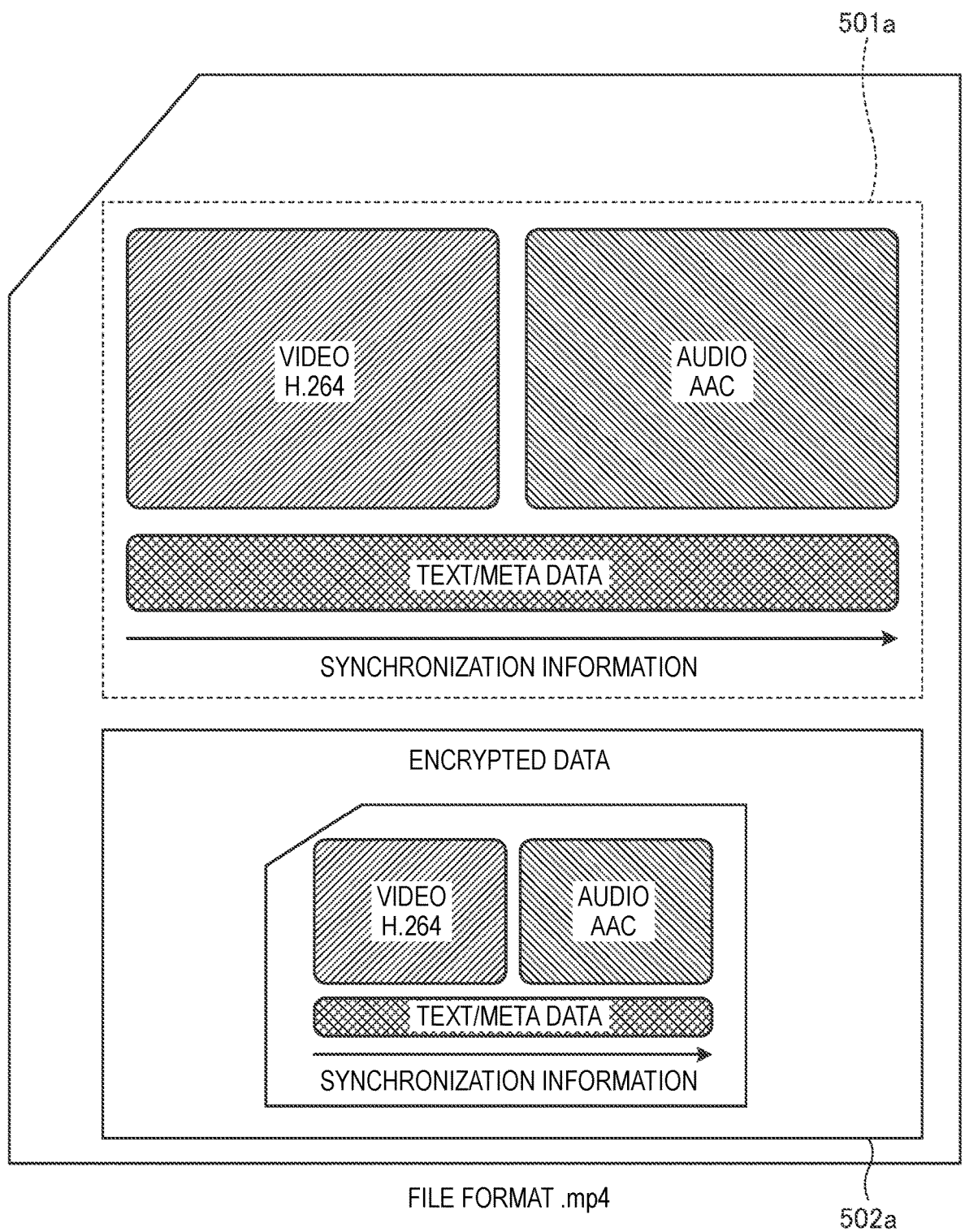
FIG. 6 shows an example of a data structure of data obtained by merging.

FIG. 6 shows an example of a data structure of data obtained by merging. As shown in FIG. 6, the video data 501*a* and the encrypted data 502*a* are stored in a container of mp4 format.

Note that, the encrypted data 502*a* may be video data, as shown in FIG. 6, or may be still image data. Also, the encrypted data 502*a* may be stored in a region for predetermined extended data of mp4 format or may be stored in a region where a video part is over-sized.

Further, the encrypted data 502*a* may contain information of coordinates indicating which position of each frame of an image output by the video data 501*a* the image of the confidential part corresponds to.

Here, it is assumed that the terminal 20 has no authority to display the confidential information. On the other hand, it is assumed that the terminal 30 has an authority to display the confidential information.

For example, the presence or absence of the authority depends on whether a key for decrypting an encrypted part or an application having a function for decrypting an encrypted part is provided in the terminal.

Since the terminal 20 has no authority, the terminal 20 displays a decoded image without decrypting the encrypted data contained in the merge data (step S14).

Figure 7:
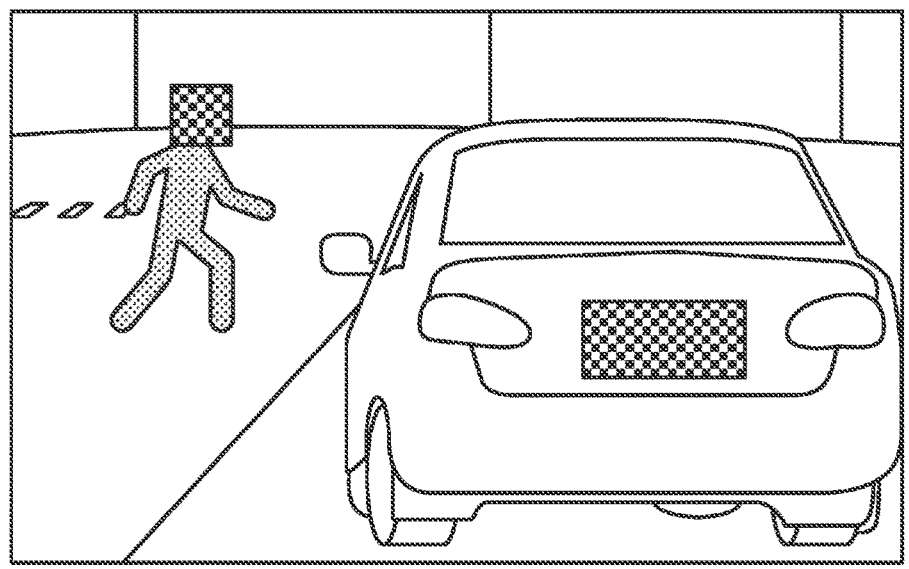
FIG. 7 shows an example of a processed image.

The terminal 20 outputs a processed image as shown in FIG. 7. FIG. 7 shows an example of a processed image. In the example of FIG. 7, the confidential part is concealed.

Although the merge data received by the terminal 20 contains the encrypted data 503, the terminal 20 has no authority, and therefore, cannot decrypt the encrypted data 503.

For this reason, the terminal 20 outputs the video data 501*a*, as it is, so that the terminal 20 displays the processed image as shown in FIG. 7.

On the other hand, since the terminal 30 has the authority, the terminal 30 synthesizes the confidential part obtained by decrypting the encrypted data contained in the merge data and the decoded image, and displays a synthesized image (step S15).

The terminal 30 can restore, for example, the license plate and the person's face and synthesize the same with the processed image. As a result, the terminal 30 displays an image equivalent to the captured image as shown in FIG. 2.

Figure 8:
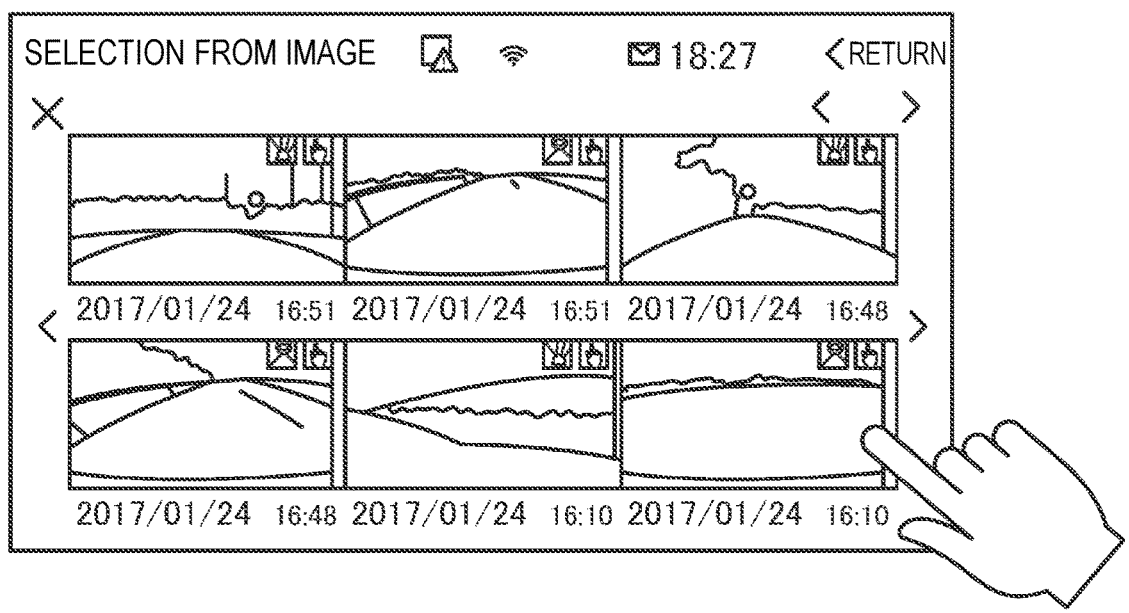
FIG. 8 shows an example of an image selection screen.

The terminal 30 may receive a selection of an image that is output from a selection screen as shown in FIG. 8. FIG. 8 shows an example of an image selection screen. The terminal 30 synthesizes the confidential part with the selected image, and outputs a synthesized image.

Figures 9, 10:
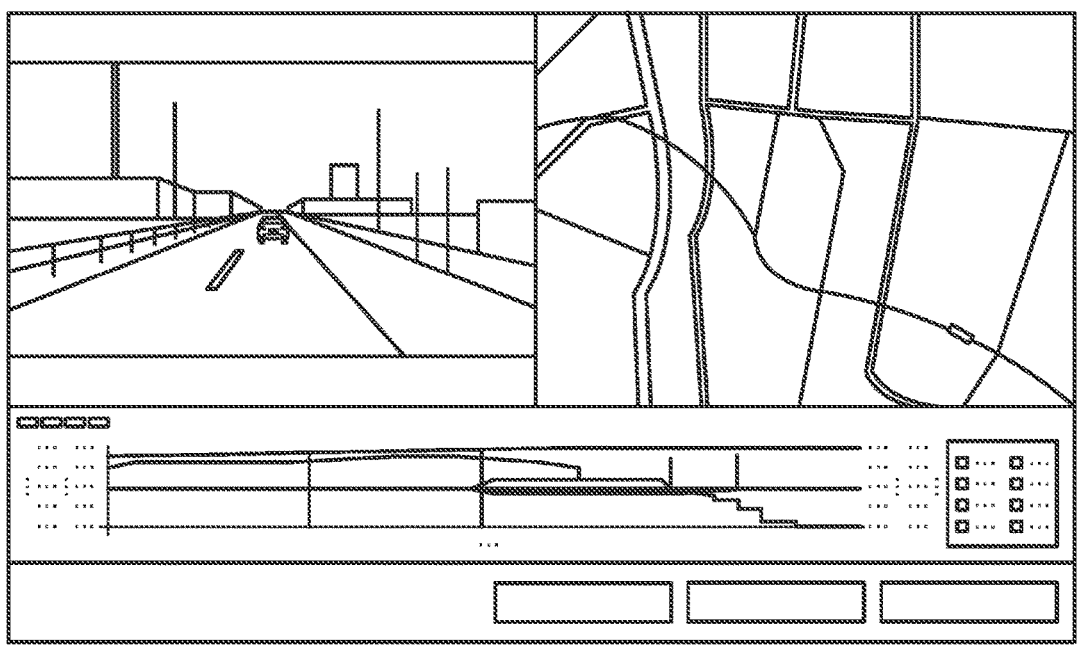
FIG. 9 shows an example of a setting screen.
FIG. 10 shows an example of an image display aspect.

Also, the terminal 30 may receive a setting of a function from a setting screen as shown in FIG. 9. FIG. 9 shows an example of a setting screen.

In the setting screen, the terminal 30 first receives a setting as to whether to release the confidentiality. When releasing the confidentiality, the terminal 30 receives whether or not to display the confidential part in a synthesis manner, whether or not to display the confidential part independently, and a setting of a release target.

For example, when there are both the license plate and the person's face as the confidential part, the terminal 30 can display only the selected confidential part.

Further, as shown in FIG. 10, the terminal 30 may display the image together with a map and a parameter such as a G value. FIG. 10 shows an example of an image display aspect.

The configurations of each device of the image processing system 1 are described. The image processing device 10 may be a drive recorder mounted on the vehicle V.

The image processing device 10 may also be implemented by an ECU (Electronic Control Unit) mounted on the vehicle V or a server capable of performing communication with the vehicle V.

Figure 11:
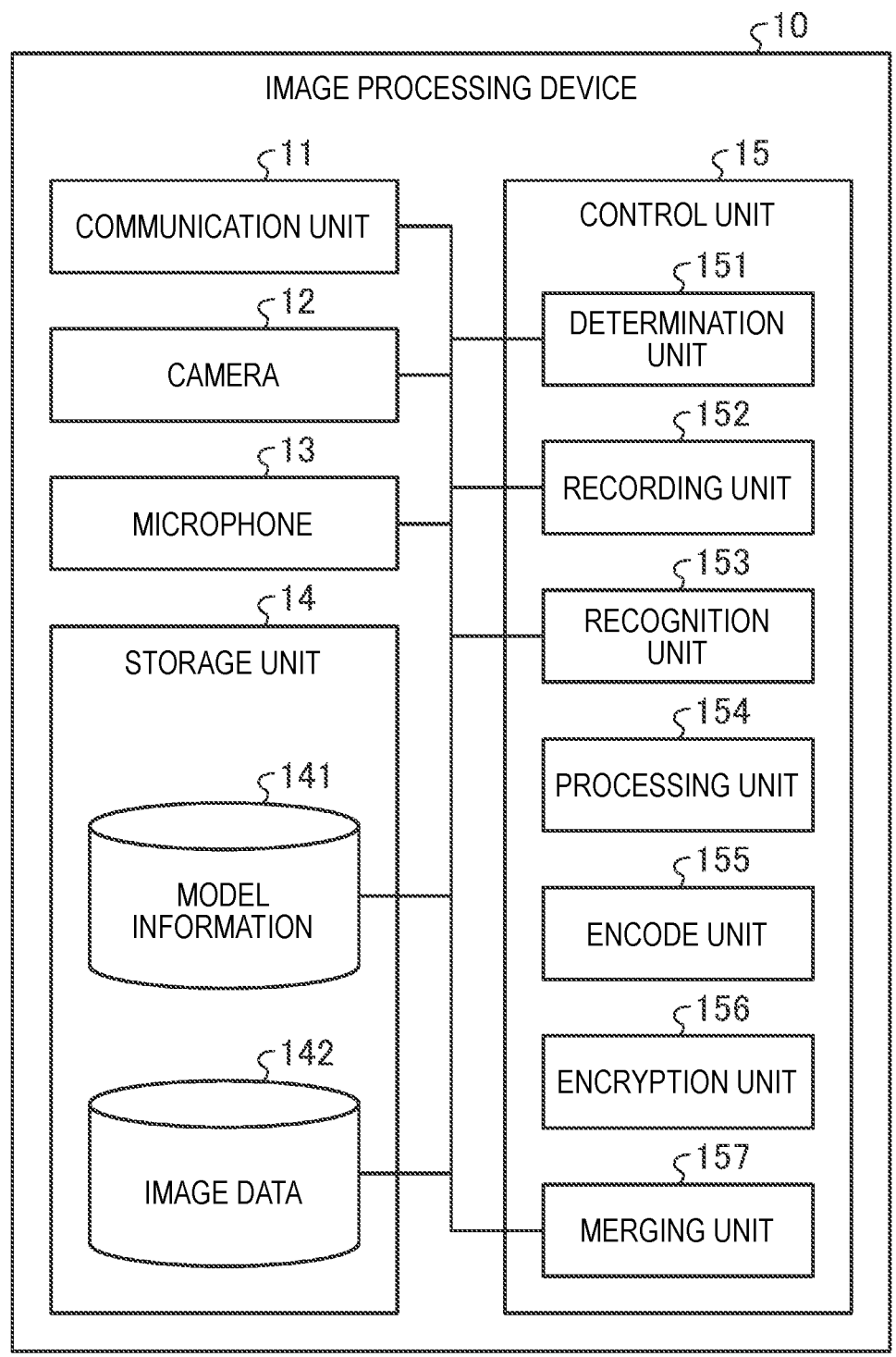
FIG. 11 shows a configuration example of an image processing device.

FIG. 11 is a functional block diagram showing a configuration example of an image processing system according to an embodiment. As shown in FIG. 11, the image processing device 10 includes a communication unit 11, a camera 12, a microphone 13, a storage unit 14 and a control unit 15.

The communication unit 11 is an interface for performing communication with other devices. The image processing device 10 is configured to perform communication with the terminal 20 and the terminal 30 via the communication unit 11.

The control unit 15 and the storage unit 14 of the image processing device 10 are implemented, for example, by a computer having a CPU (Central Processing Unit), a ROM (Read Only Memory), a RAM (Random Access Memory), a flash memory, an input/output port and the like, and a variety of circuits.

The storage unit 14 corresponds to a RAM and a flash memory. In the RAM and the flash memory, model information 141 and image data 142 are stored.

The model information 141 is information for establishing models for recognizing confidential parts. The image data 142 is data in which images captured by the camera 12 are combined with voices collected by the microphone 13.

The CPU of the computer is configured to read out and execute a program stored in the ROM, for example, thereby functioning as a determination unit 151, a recording unit 152, a recognition unit 153, a processing unit 154, an encode unit 155, an encryption unit 156 and a merging unit 157 of the control unit 15.

Note that, the image processing device 10 may also be configured to acquire the program and a variety of information via another computer connected to a wired or wireless network or a portable recording medium.

The determination unit 151 is configured to determine whether a predetermined event has occurred. For example, when a G value that is measured in real time satisfies a predetermined condition, it is determined that the vehicle V is applied with a shock.

The recording unit 152 is configured to record images captured by the camera 12 and voices collected by the microphone 13. The recording unit 152 is configured to store the images and data in the storage unit 14, as the image data 142.

The recording unit 152 may also start recording when it is determined by the determination unit 151 that an event has occurred.

The recognition unit 153 is configured to recognize a part of a confidential target from the captured image.

The processing unit 154 is configured to process the captured image so that the part recognized by the recognition unit 153 is concealed. For example, the processing unit 154 is configured to replace the part recognized by the recognition unit 153 with a predetermined pattern.

The encode unit 155 is configured to encode the image processed by the processing unit 154 into data of a predetermined format.

The encryption unit 156 is configured to encrypt data of the part recognized by the recognition unit 153. For example, the encryption unit 156 is configured to encrypt an image of a region including the part recognized by the recognition unit 153.

The merging unit 157 is configured to merge the data of the image processed by the processing unit 154 and the data encrypted by the encryption unit 156. For example, the merging unit 157 is configured to generate one file where the data encoded by the encode unit 155 and the data encrypted by the encryption unit 156 are merged.

Figure 12:
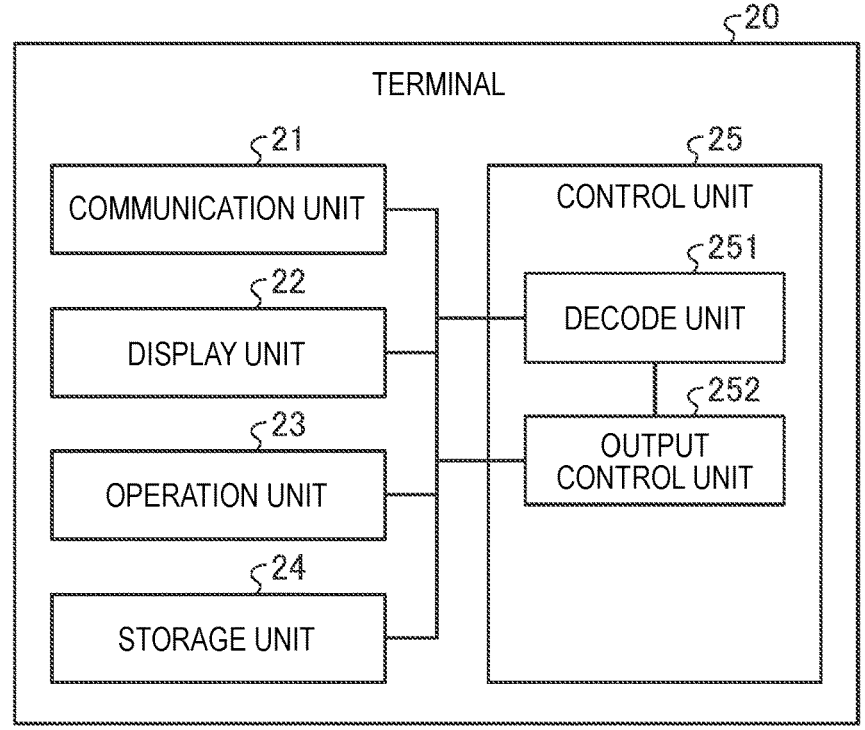
FIG. 12 shows a configuration example of a terminal.

A configuration of a terminal (for example, the terminal 20 in FIG. 1) with no authority to display the sensitive information is described with reference to FIG. 12. FIG. 12 shows a configuration example of a terminal.

As shown in FIG. 12, the terminal 20 includes a communication unit 21, a display unit 22, an operation unit 23, a storage unit 24 and a control unit 25.

The communication unit 21 is an interface for performing communication with other devices. The terminal 20 is configured to perform communication with the image processing device 10 via the communication unit 21.

The display unit 22 is a display device such as a display. The operation unit 23 is an input device such as a button. The display unit 22 and the operation unit 23 may also be configured as a touch panel display.

The control unit 25 and the storage unit 24 of the terminal 20 are implemented, for example, by a computer having a CPU, a ROM, a RAM, a flash memory, an input/output port and the like, and a variety of circuits.

The CPU of the computer is configured to read out and execute a program stored in the ROM, for example, thereby functioning as a decode unit 251 and an output control unit 252 of the control unit 25.

Note that, the image processing device 10 may also be configured to acquire the program and a variety of information via another computer connected to a wired or wireless network or a portable recording medium.

The decode unit 251 is configured to decode image data contained in the merge data received from the image processing device 10. The output control unit 252 is configured to cause the display unit 22 to output an image obtained by the decode unit 251.

As described above, the terminal 20 does not decrypt the encrypted data contained in the merge data.

Figure 13:
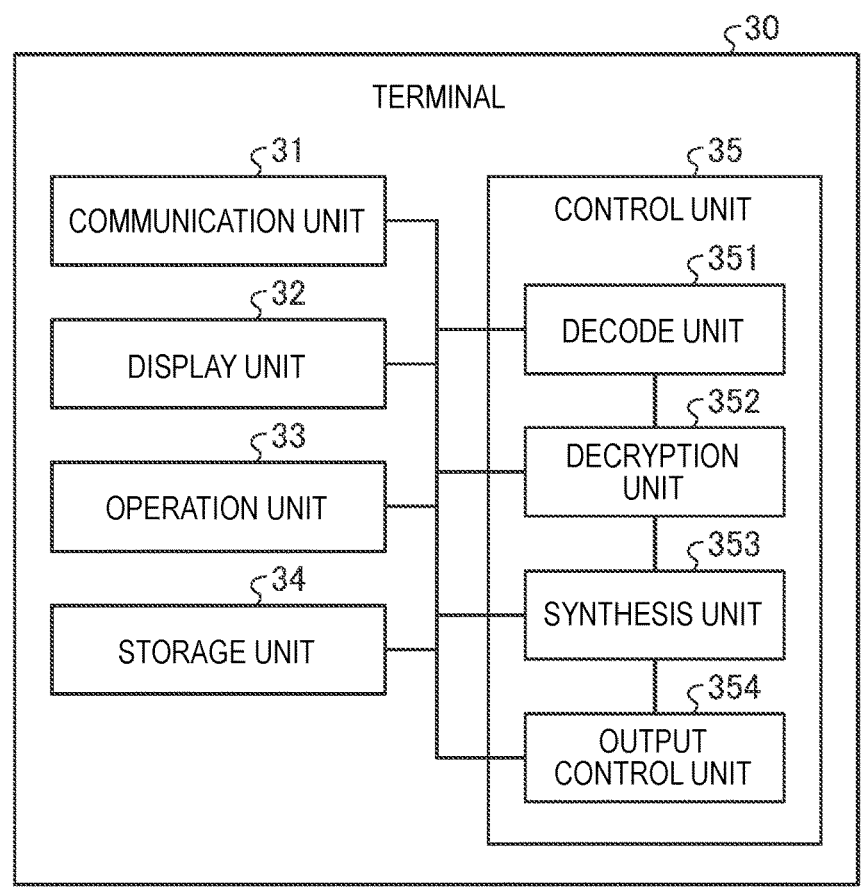
FIG. 13 shows a configuration example of a terminal.

A configuration of a terminal (for example, the terminal 30 in FIG. 1) with an authority to display the sensitive information is described with reference to FIG. 13. FIG. 13 shows a configuration example of a terminal.

As shown in FIG. 13, the terminal 30 includes a communication unit 31, a display unit 32, an operation unit 33, a storage unit 34 and a control unit 35.

The communication unit 31 is an interface for performing communication with other devices. The terminal 30 is configured to perform communication with the image processing device 10 via the communication unit 31.

The display unit 32 is a display device such as a display. The operation unit 33 is an input device such as a button. The display unit 32 and the operation unit 33 may also be a touch panel display.

The control unit 35 and the storage unit 34 of the terminal 30 are implemented, for example, by a computer having a CPU, a ROM, a RAM, a flash memory, an input/output port and the like, and a variety of circuits.

The CPU of the computer is configured to read out and execute a program stored in the ROM, for example, thereby functioning as a decode unit 351, a decryption unit 352, a synthesis unit 353 and an output control unit 354 of the control unit 35.

Note that, the image processing device 10 may also be configured to acquire the program and a variety of information via another computer connected to a wired or wireless network or a portable recording medium.

The decode unit 351 is configured to decode image data contained in the merge data received from the image processing device 10.

The decryption unit 352 is configured to decrypt the encrypted data contained in the merge data, thereby obtaining an image of the confidential part.

The synthesis unit 353 is configured to synthesize the image obtained by the encoding and the confidential part obtained by the decryption of the encrypted data.

The output control unit 354 is configured to cause the display unit 32 to output an image synthesized by the synthesis unit 353.

In this way, the terminal 30 is configured to decrypt the encrypted data contained in the merge data, and to display the sensitive information.

Figure 14:
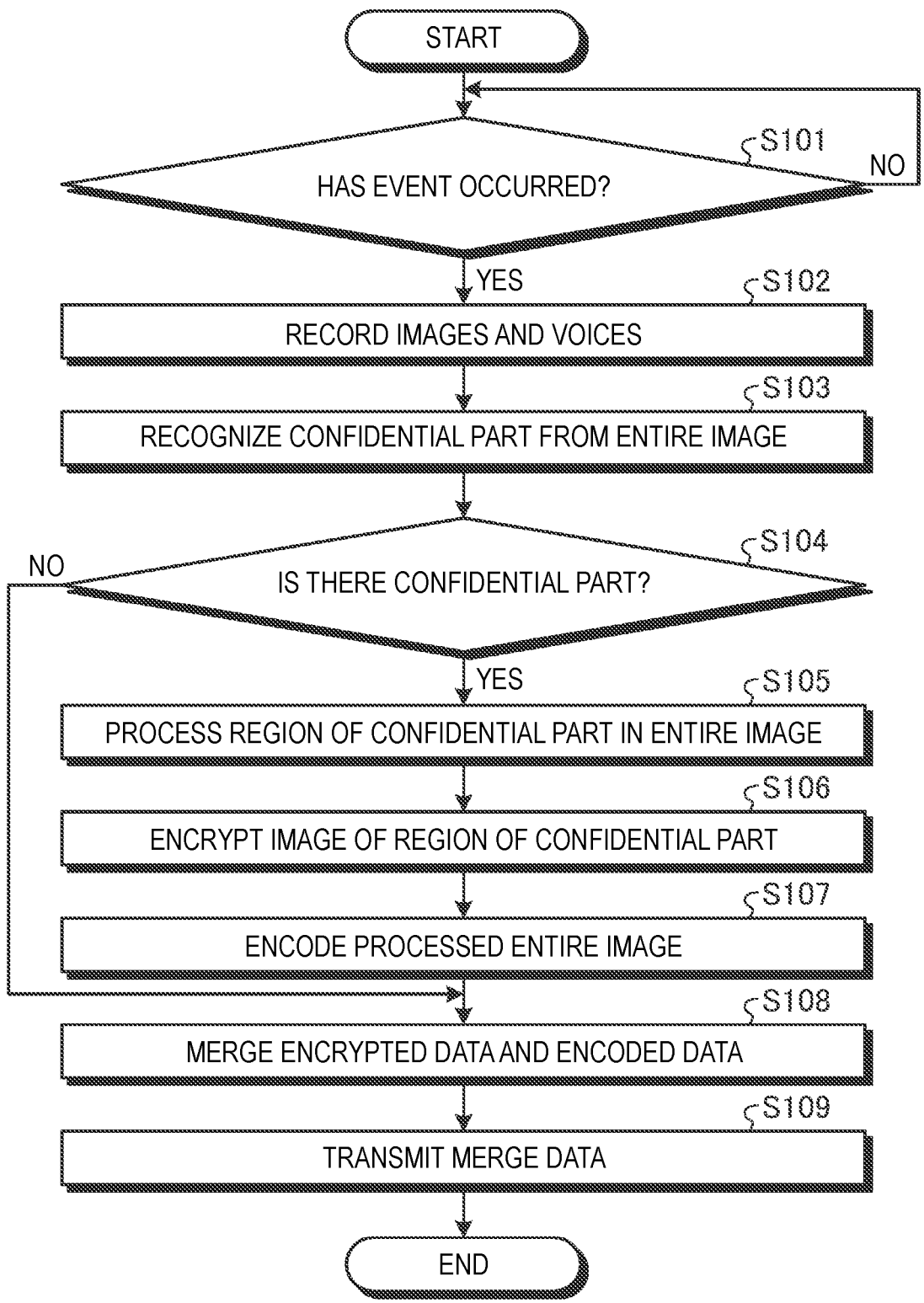
FIG. 14 is a flowchart showing a processing flow of the image processing device.

FIG. 14 is a flowchart showing a processing flow of the image processing device. As shown in FIG. 14, the image processing device 10 stands by until an event occurs (step S101, No). For example, an event is a shock to the vehicle V.

When an event occurs (step S101, Yes), the image processing device 10 records an image and a voice.

Then, the image processing device 10 recognizes the confidential part from the captured image (hereinafter, 'entire image') (step S103).

Here, when there is no confidential part (step S104, No), the image processing device 10 proceeds to step S108.

On the other hand, when there is a confidential part (step S104, Yes), the image processing device 10 processes a region of the confidential part in the entire image (step S105).

Then, the image processing device 10 encrypts an image of the region of the confidential part (step S106). In addition, the image processing device 10 encodes the processed entire image (step S107).

The image processing device 10 merges the encrypted data and the encoded data (step S108). The image processing device 10 transmits the merge data to each terminal (step S109).

Figure 15:
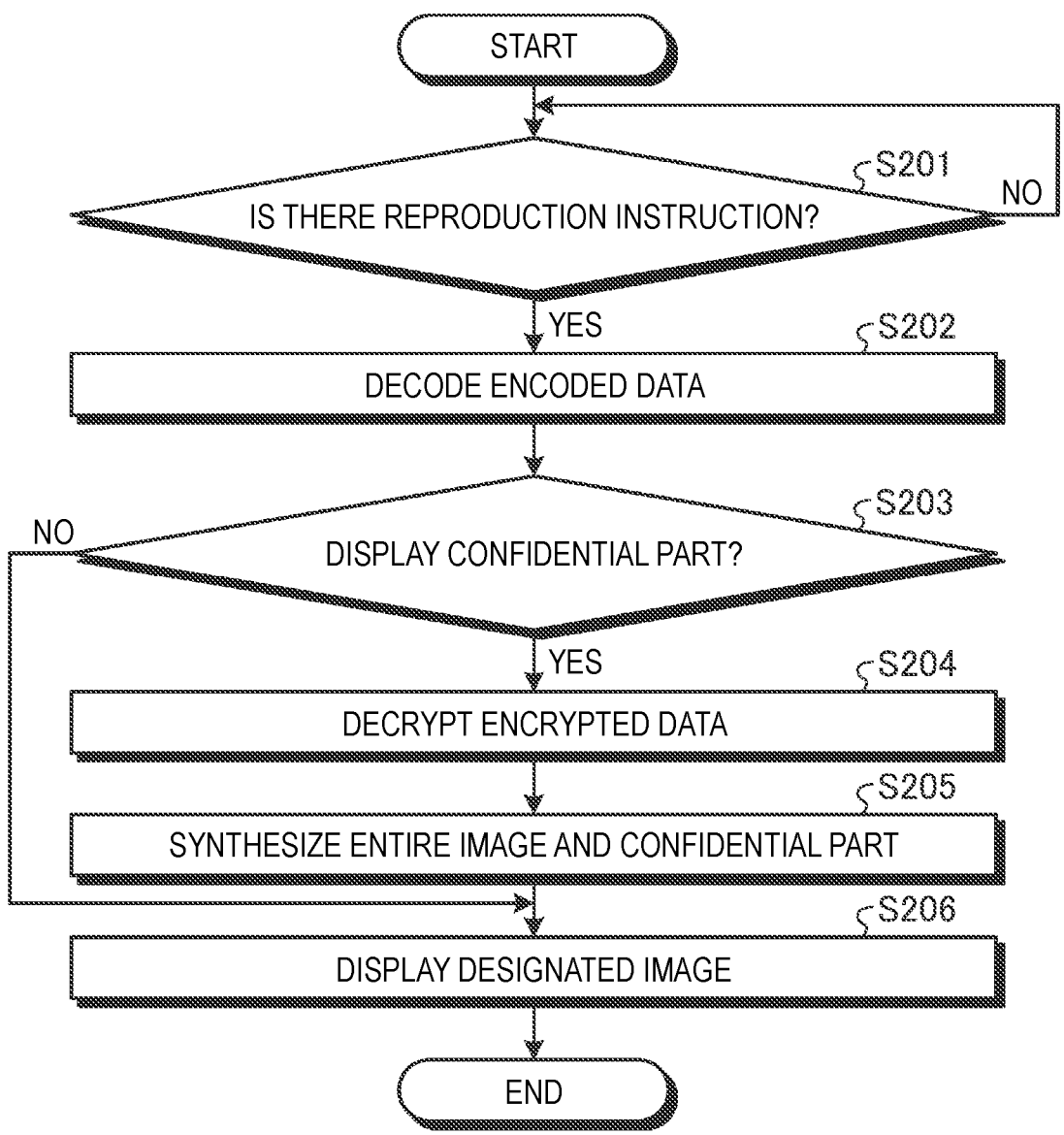
FIG. 15 is a flowchart showing a processing flow of the terminal.

FIG. 15 is a flowchart showing a processing flow of the terminal. The terminal stands by until there is an instruction to reproduce an image (step S201, No). It is assumed that the processing of FIG. 15 is common to the terminal 20 and the terminal 30.

First, the terminal decodes the encoded data (step S202).

Here, when not displaying the confidential part (step S203, No), the terminal proceeds to step S206.

On the other hand, when displaying the confidential part (step S203, Yes), the terminal decrypts the encrypted data (step S204). Note that, the terminal displays the confidential part in a case where it has an authority to display the confidential part.

Then, the terminal synthesizes the entire image and the confidential part (step S205).

Thereafter, the terminal displays a designated image (step S206). To display the confidential part, the terminal displays the image synthesized in step S205.

As described above, the image processing device 10 according to the embodiment includes the recognition unit 153, the processing unit 154, the encryption unit 156 and the merging unit 157. The recognition unit 153 is configured to recognize a part of a confidential target from the captured image. The processing unit 154 is configured to process the captured image so that the part recognized by the recognition unit 153 is concealed. The encryption unit 156 is configured to encrypt data of the part recognized by the recognition unit 153. The merging unit 157 is configured to merge the data of the image processed by the processing unit 154 and the data encrypted by the encryption unit 156.

In this way, the image processing device 10 encrypts the confidential part, separately from the image. As a result, according to the present invention, it may be possible to perform concealing processing of the sensitive information, for an image, with high security while controlling as to whether the sensitive information is to be restored.

For example, the encrypted concealed part cannot be seen with a terminal with no key to decrypt data of the encrypted confidential part. In this way, it may be possible to control whether the confidential part can be restored, by providing a key.

For example, when an image is used for a landscape image in tourist business or for an accident image in a driving institute, the confidential part is not necessary. Therefore a key is not provided to a business operator who uses such an image.

On the other hand, when an image is used for vehicle insurance evaluation, police investigation, marketing analysis and the like, the information of the confidential part is necessary. Therefore a key is provided to a business operator who uses such an image.

The merging unit 157 is configured to generate one file by merging the data encoded by the encode unit 155 and the data encrypted by the encryption unit 156.

The terminal decodes the data of the processed data contained in the merge data acquired from the image processing device 10. In a case where the terminal is provided with information for decrypting the data encrypted by the image processing device 10, the terminal synthesizes the image obtained by decrypting the encrypted data with the decoded image.

The additional effects and modified embodiments can be easily conceived by one skilled in the art. For this reason, the wider aspect of the present invention is not limited to the specific details and representative embodiment described in the above. Therefore, a variety of changes may be made without departing from the spirit or scope of the concepts of the general invention defined by the appended claims and equivalents thereto.

Figure 16:
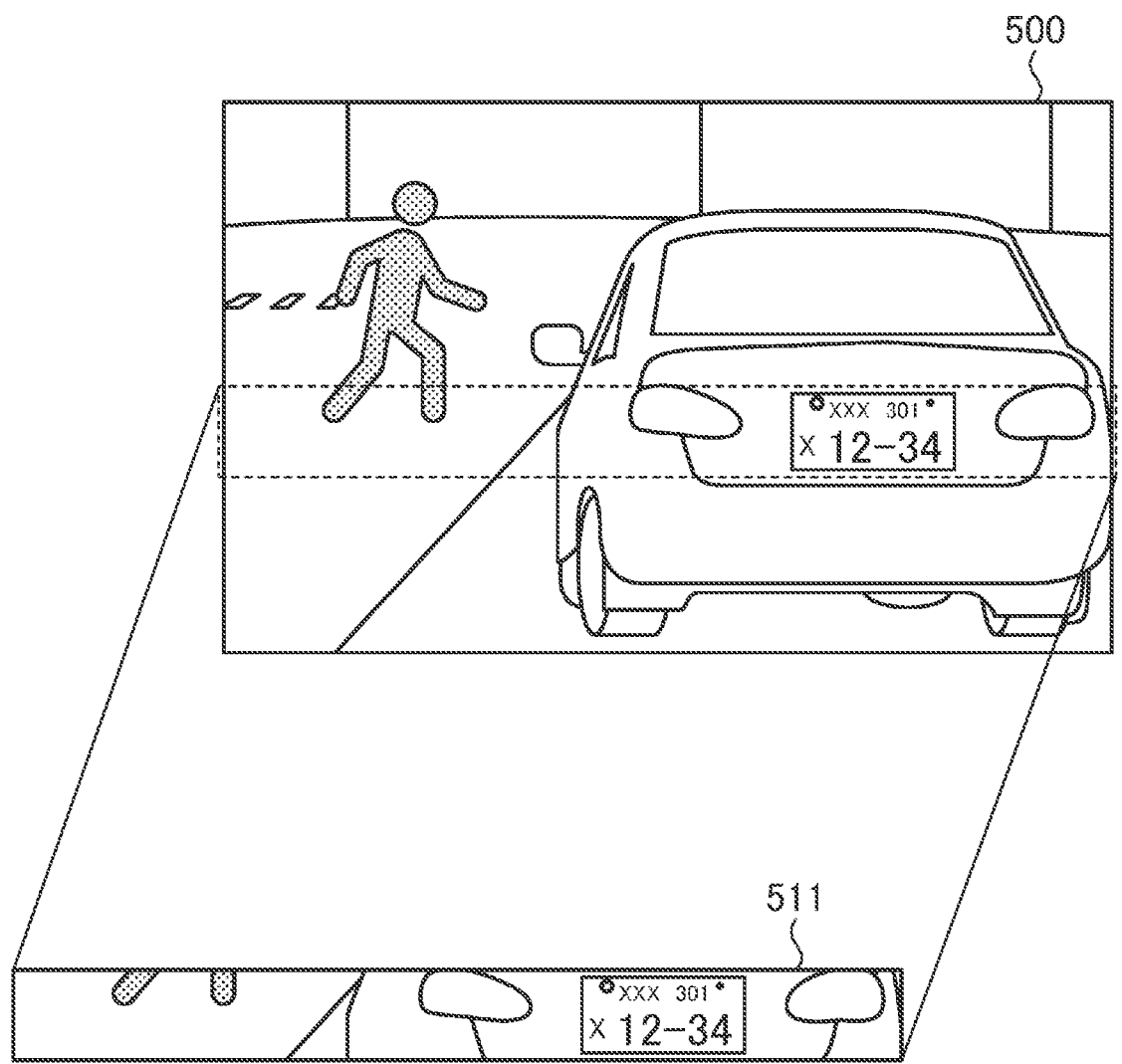
FIG. 16 is a diagram illustrating an image processing.

For example, the image processing device 10 may regard an image 511 of a strip-shaped region as shown in FIG. 16, as the data of the confidential part. FIG. 16 is a diagram illustrating an image processing.

In this case, the encryption unit 156 encrypts an image of a rectangular region including a part recognized by the recognition unit 153 and having the same horizontal width as that of a captured image.

In this way, by setting the strip-shaped region along a general scanning direction of an image, as a processing target, a processing load relating to the image processing (memory usage, etc.) may be reduced.

What is claimed is:

1. An image processing device comprising:
   a hardware processor configured to
      recognize a part of a confidential target from a captured image;
      image-process the captured image such that the recognized part is concealed;
      encrypt data relating to the recognized part;
      encode the image-processed image into data of a predetermined format, and
      generate a file by merging the encoded data and the encrypted data in a container of mp4 format.

2. The image processing device according to claim 1, wherein
   the hardware processor is configured to replace the recognized part with a predetermined pattern.

3. The image processing device according to claim 1, wherein
the hardware processor is configured to encrypt an image of a region including the recognized part.

4. The image processing device according to claim 2, wherein
the hardware processor is configured to encrypt an image of a region including the recognized part.

5. The image processing device according to claim 3, wherein
the region is a rectangular region having a width same as a width of the captured image.

6. An image processing method executed by an image processing device, the image processing method comprising:
recognizing a part of a confidential target from a captured image;
image-processing the captured image such that the recognized part is concealed;
encrypting data relating to the recognized part;
encoding the image-processed image into data of a predetermined format; and
generating a file by merging the encoded data and the encrypted data in a container of mp4 format.

7. An image processing method, executed by an image processing system including an image processing device and a terminal, the image processing method comprising:
recognizing, by the image processing device, a part of a confidential target from a captured image;
image-processing, by the image processing device, the captured image such that the recognized part is concealed;
encrypting, by the image processing device, data of the recognized part;
encoding the image-processed image into data of a predetermined format;
generating, by the image processing device, a file by merging the encoded data and the encrypted data in a container of mp4 format;
decoding, by the terminal, the encoded data of the image-processed image contained in the generated file acquired from the image processing device; and
synthesizing, by the terminal to which information for decrypting the encrypted data encrypted by the image processing device is provided, an image obtained by decrypting the encrypted data with the decoded image.

8. A non-transitory computer readable medium storing an image processing program causing a computer to execute a process comprising:
recognizing a part of a confidential target from a captured image;
image-processing the captured image such that the recognized part is concealed;
encrypting data relating to the recognized part;
encoding the image-processed image into data of a predetermined format; and
generating a file by merging the encoded data and the encrypted data in a container of mp4 format.

* * * * *